United States Patent [19]

Siener et al.

[11] Patent Number: 5,010,578
[45] Date of Patent: Apr. 23, 1991

[54] METHOD AND APPARATUS FOR THE IDENTIFICATION OF METAL SURFACE FINISHES

[75] Inventors: Pierre Siener, Thionville; Antoine Steiner, Metz, both of France

[73] Assignee: Institut de Recherches de la Siderurgie Francaise-Irsid, Puteaux, France

[21] Appl. No.: 380,354

[22] Filed: Jul. 17, 1989

[30] Foreign Application Priority Data

Jul. 20, 1988 [FR] France ............................ 88 09833

[51] Int. Cl.⁵ .................. G06K 9/00; G06K 9/46; G06K 9/52; G06K 9/66
[52] U.S. Cl. ............................... 382/8; 382/18; 382/28; 358/101; 73/104
[58] Field of Search ............... 382/8, 18, 28, 68, 41, 382/51; 358/101; 73/104

[56] References Cited

U.S. PATENT DOCUMENTS

| | | | |
|---|---|---|---|
| 4,229,797 | 10/1980 | Ledley | 382/6 |
| 4,435,837 | 3/1984 | Abernathy | 382/41 |
| 4,682,220 | 7/1987 | Beurskens | 358/106 |
| 4,835,708 | 5/1989 | Frans | 73/23.35 |

FOREIGN PATENT DOCUMENTS 2115142 of 0000 United Kingdom .

OTHER PUBLICATIONS

Patent Abstracts of Japan, vol. 11, No. 15 (P-536) (2462), Jan. 16, 1987, JP-A-61 189 406 (Hitachi Ltd.) 23-08-1986.

Huynh, Van-Minh et al., "A New Optical Method of Paper Roughness Measurement for Hard-Copy Devices", Society for Information Display International Symposium, Digest of Technical Papers, New Orleans May 12-14, 1987, vol. XVIII, pp. 279-282, Palisades Institute for Research Services Inc., New York, U.S.

*Primary Examiner*—David K. Moore
*Assistant Examiner*—Michael R. Cammarata
*Attorney, Agent, or Firm*—Pollock, Vande Sande & Priddy

[57] ABSTRACT

The apparatus includes a specialized scanning system for sampling the metal includes an annular light source for ominidirectionally illuminating the surface, a light regulator, and a matrix camera for forming a grey level image of the surface. The image is histogramed according to grey level. The first four statistical moments are calculated from the histogram. The moments are then used as a feature vector to identify the metal surface. If no match is found within the catalogued metal surfaces, allowing for predetermined tolerances for each moment, then the feature vector is catalogued for future recognition.

8 Claims, 5 Drawing Sheets

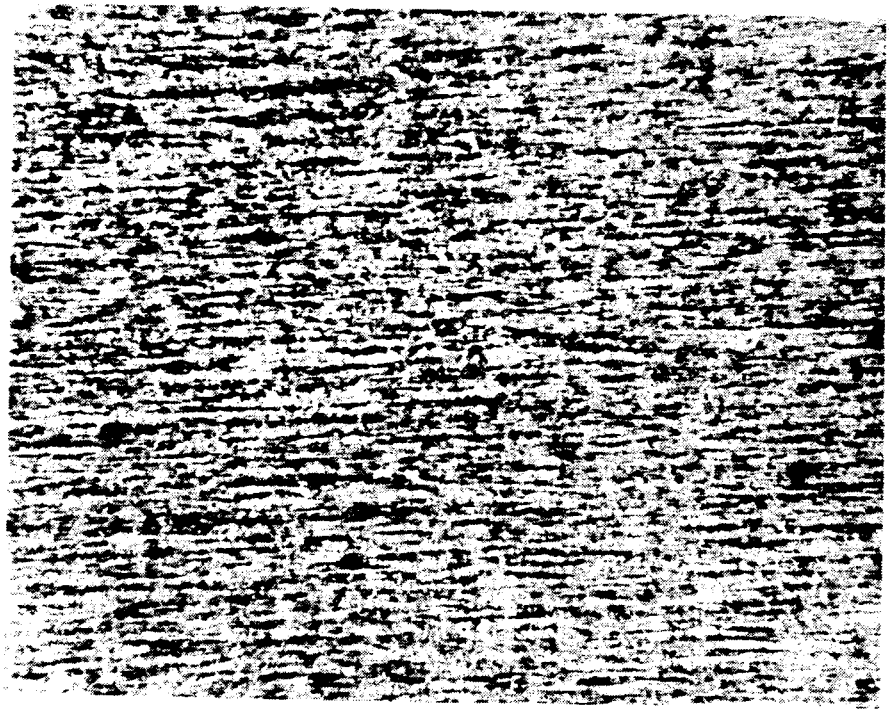
fig_2
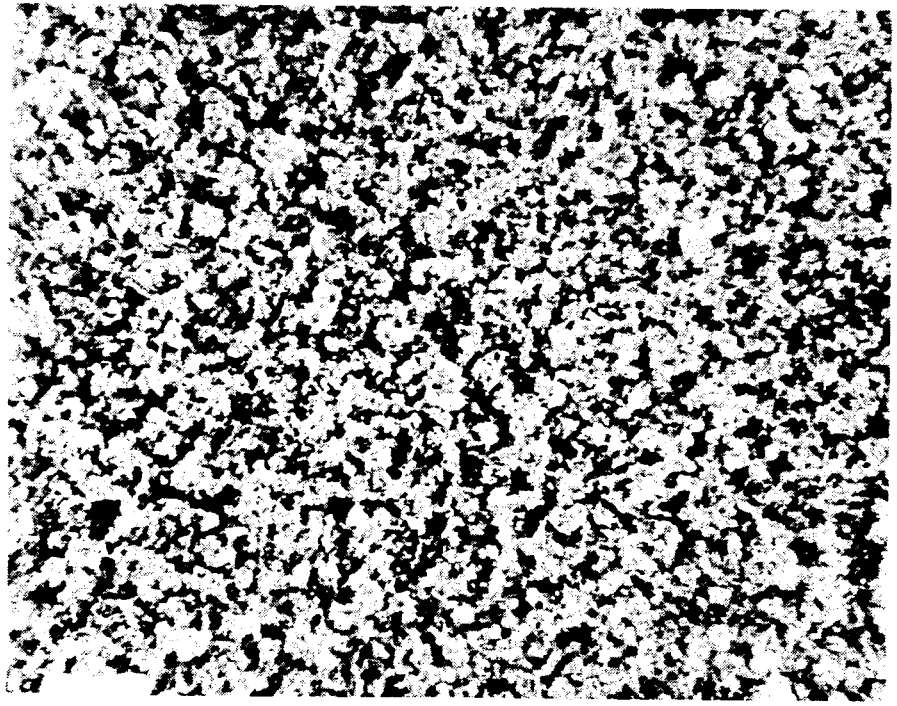
fig_3

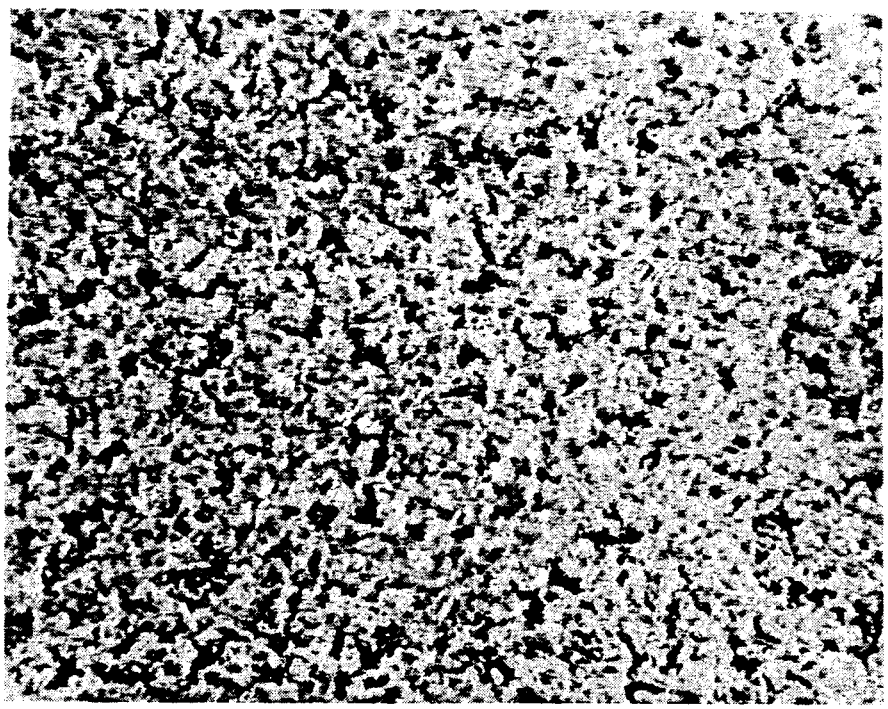
fig_4
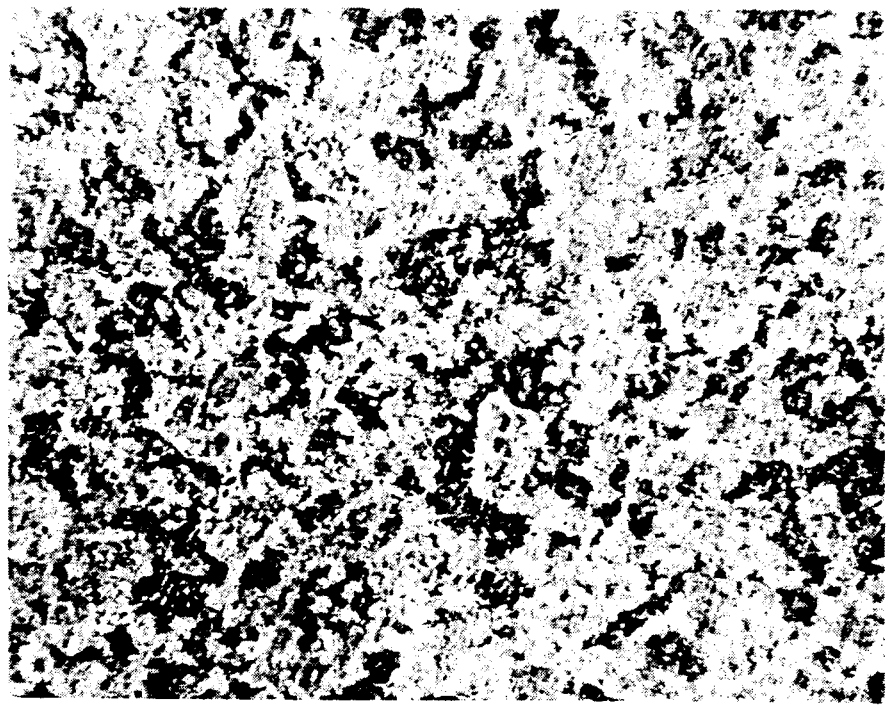
fig_5

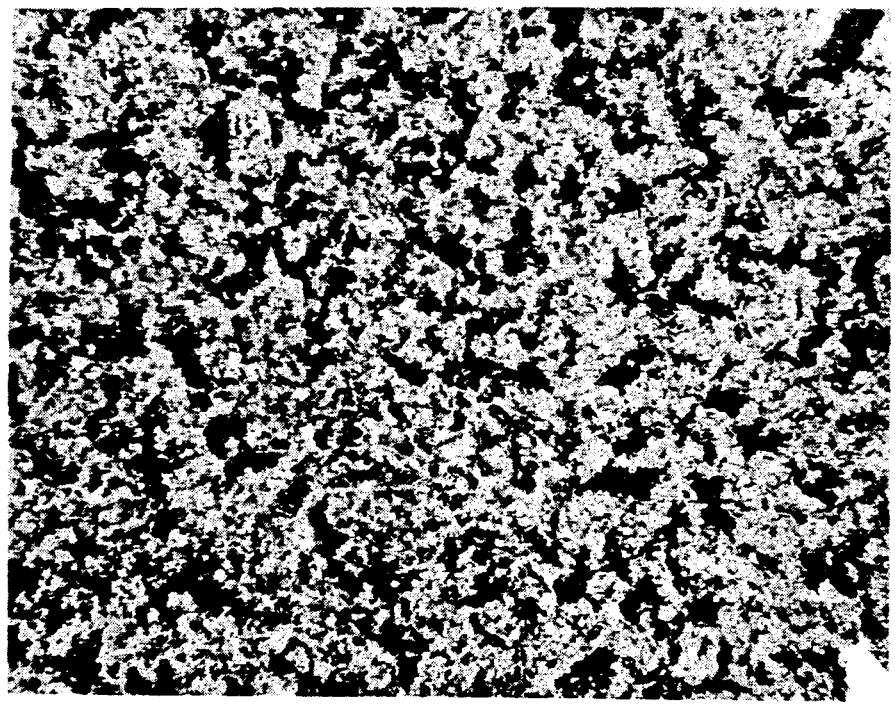
fig_6

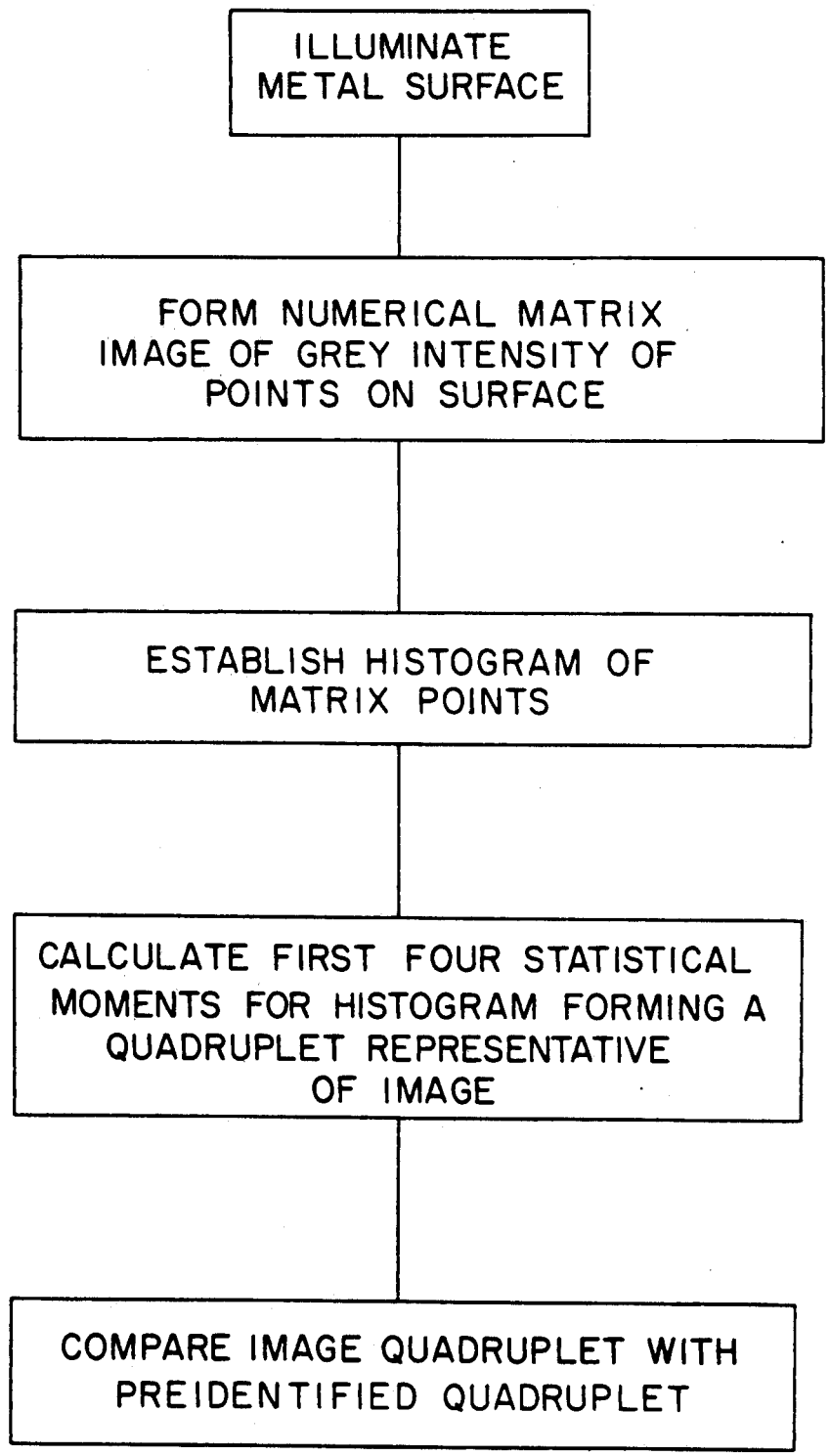

METHOD AND APPARATUS FOR THE IDENTIFICATION OF METAL SURFACE FINISHES

FIELD OF THE INVENTION

The present invention concerns the identification of metal surface finishes.

BACKGROUND OF THE INVENTION

Numerous methods are known for determining optically, therefore without contact, the various characteristics of a surface. One such method is known, for example, from French patent FR-A-2 484 633 and French patent FR-A-2 172 213. Devices are also known for measuring the roughness and relief of a surface, for instance from French patent FR-A-2 208 107 or FR-A-2 593 599. These methods generally employ collimated light beams directed onto the surface and rediffused from the surface under conditions which permit obtaining local surface data; the set of local data permits the reconstitution of general data for the surface.

However, as concerns the surface finish of metal parts a person skilled in the art has until present relied above all upon his own experience and empirical judgement, which the above-mentioned methods, overly sophisticated, are incapable of replacing. A person skilled in the art relies upon the visual aspect of the metal examined in order to attribute a classification: although the classification is not unrelated to the roughness of the surface it is not the knowledge of the latter which determines the classification, but rather criteria such as homogeneity, "colour" or "density" (an open or tight aspect) of the sample, these criteria defining rather the texture of the surface than its roughness.

OBJECT OF THE INVENTION

The object of the invention is to provide an automatic method and apparatus for the identification of metal surface finishes which can replace human judgement.

This object is realised by a method outlined in FIG. 7 in which: the surface is lit omnidirectionally (or at least a sample of the surface), a numerical matrix image of the surface is formed, in which each matrix point is associated with a grey intensity value as a function of the luminous intensity reflected by the corresponding surface element, the set of gathered values is processed in the following way: a histogram is established, for the entire set of matrix points, of the number of points per level of grey intensity, the first four statistical moments of the histogram are calculated in such a way as to form a quadruplet constituting four coordinates of an identification vector of the image, of the order of four or higher, this quadruplet being representative of the image, said quadruplet of the image is compared to at least one of several pre-identified and catalogued quadruplets, and if the quadruplet of the image is equal, allowing for predetermined tolerances for each moment, to one of said catalogued quadruplets, the identity of the catalogued quadruplet is attributed to he quadruplet calculated.

It has indeed been found that the choice of the first four statistical moments respectively representing the mean, the dispersion, the skewness and the oblateness of the histogram, as the descriptive factors of the sample enable a classification of the surface finishes which corroborates the empirical judgement of the person skilled in the art, while providing an objective reliability.

It must be noted that the four above-mentioned moments are necessary but not obligatorily sufficient to completely define the image, that is practically to enable its reconstruction. They constitute in fact four coordinates of a vector in a space of n dimensions, where n is equal to or greater than 4, the other coordinates of this vector being necessary to completely define the image. On the other hand, the four moments considered are sufficiently descriptive of the image to enable the establishment of a comparison between two images.

The global omnidirectional lighting of the sample surface is as uniform as possible. Preferably, the lighting is annular, white, and positioned above the sample disc, centered on the optical axis of the system. The lighting may be advantageously associated with a regulating means.

The formation of a numerical matrix image is carried out in accordance with conventional methods employed in the field, preferably by means of a matrix camera and a suitable conventional lens, affording a high quality exposure.

According to an important feature of the invention, the comparison of the quadruplet describing the sample to those of the catalogue is carried out by successive tests on the graded statistical moments, beginning with the moment of the first order.

If the quadruplet describing the sample is not recognized, it is possible to record the quadruplet in the catalogue in such a way as to enrich the catalogue; the system of the invention thus being continuously perfected.

The method of the invention is applied to a static observation of the sample; but the speed of numerical data processing systems affords a continuous exploration of a surface: it is possible continuously to survey the evolution of the describing quadruplet and for example to detect its deviation from a predefined normal range, the determination of the deviation from this range being made preferably by the procession of several consecutive images (for example 3), in order to avoid taking into account a possible parasitic image caused, for example, by very local surface defect.

The invention also relates to an apparatus for carrying out the method described above, such an apparatus including:

means for globally omnidirectionally lighting said surface, means for forming a numerical matrix image of said surface, in which each matrix point is associated with a value of grey intensity as a function of the luminous intensity reflected by the corresponding element of the surface, means for processing the set of collected values, said means arranged in such a way as:

to calculate the first four statistical moments of a histogram, formed for the entire set of matrix points, of the number of points per level of grey intensity, to form with these four moments a quadruplet representing the image and constituting four coordinates of an identification vector of the image, of order equal to or greater than four, to compare the quadruplet of the image to at least one of several pre-identified and catalogued quadruplets, and if said image quadruplet is equal, allowing for predetermined tolerances for each moment, to one of said catalogued quadruplets, to attribute to said image quadruplet the identity of said catalogued quadruplet, and means for restitution of the results of said processing.

Other characteristics and advantages of the invention will become apparent through the following description in which reference is had to the accompanying figures in which:

FIGS. 2 to 6 are photographs of samples of different finish classes, taken under the lighting conditions of the apparatus of FIG. 1 and enlarged 40X.

FIG. 7 is an outline of the method used in the invention.

DETAILED DESCRIPTION OF THE PREFERRED EMBODIMENT

Figure 1:
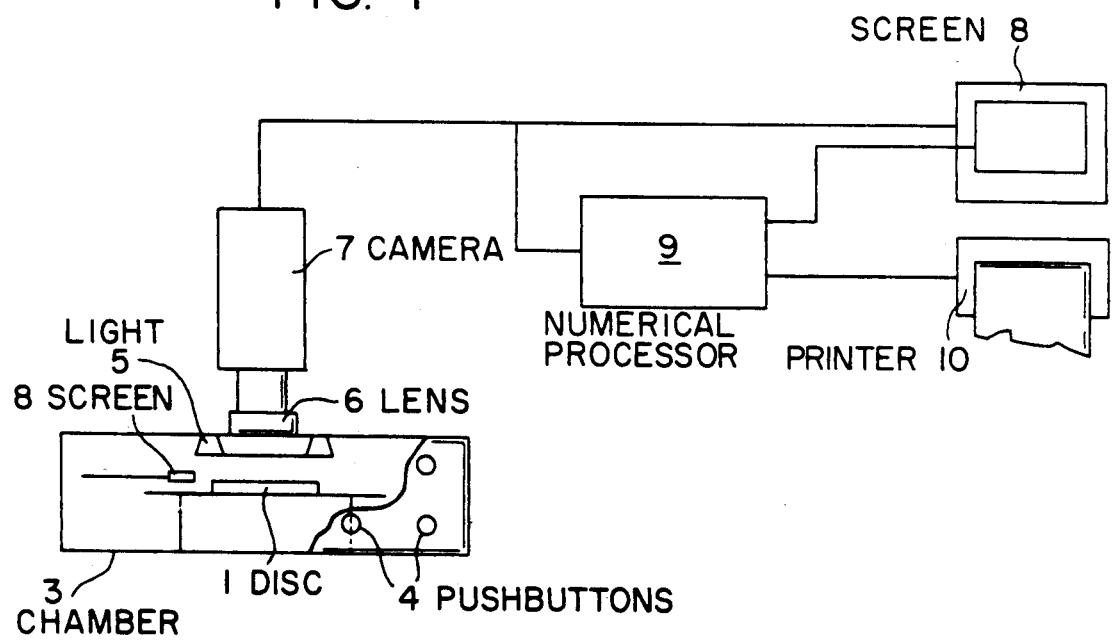
FIG. 1 is a schematic of an apparatus according to the invention, applied to the static observation of a sample.

In FIG. 1 is shown a surface sample disc 1, of several tens of $cm^2$, placed on a sample plate 2 within a work chamber 3. The sample plate 2 is moveable in two horizontal directions due to conventional mounting means not shown; it may be manoervred manually, or by push-buttons or levers 4. The mobility of the sample enables notably the observation of different zones on the same sample in order to avoid erroneous data which could result from possible surface disturbances. This mobility affords for example the elimination of extremely disturbed zones, or the determination of the mean of values determined for different zones in order to take into account the slight heterogeneity of the surface finish on value zones.

The chamber 3 is closed in such a way as not to undergo the influence of exterior lighting, and is lit, above the sample plate 2, by an annular lighting 5 surrounding the lens edge 6 of a vertical matrix camera 7.

The annular lighting is preferably equipped with a conventional stabilizing device including a light sensor 8 connected in a feedback control loop with the power supply to the lighting. If the device for analysing the grey intensities operates according to a differential rather than an absolute process, this stabilization is unnecessary.

The matrix camera 7 is a matrix camera (charge-transfer detector) comprising a photosensitive matrix (for example of 256×384 sensors) which produces an analog video signal.

This signal can be read on a control screen 8 which provides a matrix image of the sample 1.

This signal is also input into a numerical processing device 9. Thus numerical processing device receives the data in the form of a set of triplets characteristic of each matrix point and composed of two-dimensional coordinates of the point and of the grey intensity related to the point. From this data, the device calculates the first four statistical moments of the histogram of the number of matrix points as a function of their grey level. The results of this calculation can be viewed on the screen 8 or on the printer 10. Once this calculation is made, the sample is characterized by these four describing factors, which afford its identification.

The identification is only possible if a catalogue has been previously composed. This catalogue is created based upon known samples the descriptive factors of which have been calculated.

The identification of an unknown sample then consists in comparing the quadruplet made up of the four describing factors calculated with a quadruplet of a known sample. It has been found that the most expedient method for accomplishing this consists in successively and gradedly testing the four describing factors, beginning with the first moment. Each test of order i compares the calculated moment of order i with the set of catalogued moments of order i; if the calculated moment sufficiently matches (within a predetermined tolerance) a catalogued moment, the test of order i+1 is begun; if not the sample is immediately declared unrecognized. If the four successive tests of order 1,2,3,4 are positive, the sample is declared identified and receives the grade of its match from the catalogued, grade which can be viewed on the screen or on the printer.

When a sample is not recognized, the system can be used in two ways. Either the sample is definitely discarded, or it may be used to enrichen the catalogue in which no match was found.

In a variant of the identification process, the sample is tested in order to determine whether or not it belongs to an identified class. In this case, it is unnecessary to compare the calculated quadruplet to the entire set of quadruplets of the catalogue, but only to quadruplets of said class.

As an example of the invention, the table below gives an example of a catalogue with the values of calculated statistical moments for five different finish types, for which the photographs are shown in FIGS. 2 to 6.

| Finish Type | F2 | F3A | F5B | F7B | F10 |
| --- | --- | --- | --- | --- | --- |
| moment 1 | 161 | 167 | 182 | 180 | 171 |
| moment 2 | 49 | 67 | 50 | 86 | 90 |
| moment 3 | 0.1 | 0.2 | 0.1 | 0.2 | 0.1 |
| moment 4 | 2.2 | 3.2 | 3 | 2.8 | 3 |
| photo | FIG. 2 | FIG. 3 | FIG. 4 | FIG. 5 | FIG. 6 |

In this example, it may be observed that the set of surface finishes can be distinguished by using the first four statistical moments and that, as in the presented case, the distinguishing describing factor is not always the same.

The results obtained using this catalogue afford a recognition rate of the order of 85% of the samples presented, that is 85% of the samples classified by the person skilled in the art in one of the finish type classes of the table are recognized by the device as belonging to that type class. The confusion observed in certain cases may be explained by the fact that a sample may belong at the same time to two neighbouring classes (overlapping of the characteristic limits of the sample). It should be noted that in such conditions, the person skilled in the art and the apparatus of the invention are in agreement.

Furthermore, it is noted that in the experiments carried out by the inventors, in order to determine the optical tolerances for each moment, a known method was used based upon the utilisation of the standard deviation on each moment determined during the trials. More complete information on such methods can be had by referring to the work entitled "Recherche et Experimentation en Agriculture" (Research and Experimentation in Agriculture) by F. Boeuf and A. Vessereau: Volume 2—Méthodes statistiques en Biologie et en Agronomie (Statistical Methods in Biology and Agronomy)—chapters 3 to 6; the teachings of which are incorporated in the present by reference.

It is claimed that:

1. Method for the identification of metal surface finishes, wherein: at least a sample portion of said surface is omnidirectionally lit,
   a numerical matrix image of said surface is formed, in which each matrix point is associated with a value of grey intensity as a function of the luminous intensity reflected by the corresponding element of the surface,
   the set of collected values is processed in the following way:
   a histogram is established, for the entire set of matrix points, of the number of points per level of grey intensity,
   the first four statistical moments are calculated for said histogram, forming a quadruplet constituting four coordinates of an identification vector of the image, of order equal to or greater than four, said quadruplet being representative of the image,
   said image quadruplet is compared to at least one of several pre-identified and catalogued quadruplets,
   and if the image quadruplet is equal, allowing for predetermined tolerances for each moment, to one of said catalogued quadruplets, said image quadruplet is attributed the identity of said catalogued quadruplet.

2. Method according to claim 1, wherein the image quadruplet is compared by successive tests on the graded statistical moments beginning by the moment of the first order.

3. Method according to claims 1 or 2, wherein if the image quadruplet to be identified is not equal, within said tolerances, to one of said catalogued quadruplets, said image quadruplets is catalogued.

4. Apparatus for the identification of metal surface finishes, comprising:
   means for globally and omnidirectionally lighting said surface,
   means for forming a numerical matrix image of said surface, in which each matrix point is associated with a value of grey intensity as a function of the luminous intensity reflected by the corresponding element of the surface,
   means for processing the set of collected values, said means arranged in such a way as:
   to calculate the first four statistical moments of a histogram, formed for the entire set of matrix points, of the number of points per level of grey intensity,
   to form with said four moments a quadruplet representative of the image and constituting four coordinates of an identification vector of the image, of order equal to or greater than four,
   to compare the image quadruplet to at least one of several pre-identified and catalogued quadruplets,
   and if said image quadruplet is equal, allowing for predetermined tolerances for each moment, to one of said catalogued moments, to attribute to said image quadruplet the identify of said catalogued quadruplet,
   and means for the restitution of the results of said processing.

5. Apparatus according to claim 4 wherein the means for lighting are annular.

6. Apparatus according to any one of claims 4 or 5, wherein the means for lighting are associated with a luminous intensity regulating device.

7. Apparatus according to claim 4, wherein the means for forming an image comprise a matrix camera.

8. Apparatus according to claim 4, wherein the means for processing are associated with a viewing screen and/or a printer.

* * * * *